(12) United States Patent
Lambourne et al.

(10) Patent No.: US 11,367,543 B2
(45) Date of Patent: Jun. 21, 2022

(54) ELECTRICAL MACHINE WINDING ASSEMBLY AND METHOD OF MANUFACTURE THEREOF

(71) Applicant: ROLLS-ROYCE plc, London (GB)

(72) Inventors: Alexis Lambourne, Belper (GB); Alexander C. Smith, Holmfirth (GB); Jameel B. Khan, Manchester (GB)

(73) Assignee: Rolls-Royce plc

( * ) Notice: Subject to any disclaimer, the term of this patent is extended or adjusted under 35 U.S.C. 154(b) by 217 days.

(21) Appl. No.: 16/558,640

(22) Filed: Sep. 3, 2019

(65) Prior Publication Data

US 2020/0098492 A1  Mar. 26, 2020

(30) Foreign Application Priority Data

Sep. 20, 2018  (GB) ...................... 1815302

(51) Int. Cl.
| | |
|---|---|
| *H01B 13/00* | (2006.01) |
| *H01B 19/00* | (2006.01) |
| *H02K 3/34* | (2006.01) |
| *H02K 3/50* | (2006.01) |
| *H02K 15/00* | (2006.01) |
| *B33Y 10/00* | (2015.01) |
| *B33Y 30/00* | (2015.01) |

(52) U.S. Cl.
CPC ......... *H01B 13/0013* (2013.01); *H01B 19/00* (2013.01); *H02K 3/34* (2013.01); *H02K 3/505* (2013.01); *H02K 15/0056* (2013.01); *B33Y 10/00* (2014.12); *B33Y 30/00* (2014.12)

(58) Field of Classification Search
USPC .......................................................... 29/825
See application file for complete search history.

(56) References Cited

U.S. PATENT DOCUMENTS

| 2004/0196128 A1 | 10/2004 | Du Val |
| 2006/0022549 A1 | 2/2006 | Otsuji |
| 2012/0313477 A1 | 12/2012 | Haga et al. |

(Continued)

FOREIGN PATENT DOCUMENTS

| CN | 104242522 | 12/2014 |
| DE | 102014106851 A1 | 11/2015 |

(Continued)

OTHER PUBLICATIONS

Great Britain search report dated Feb. 25, 2019, issued in GB Patent Application No. 1815302.3.

(Continued)

*Primary Examiner* — Quana Grainger
(74) *Attorney, Agent, or Firm* — Barnes & Thornburg LLP

(57) ABSTRACT

A method of manufacturing a winding assembly for an electrical machine, the method comprising: forming, by three-dimensional, 3D, printing, an electrically insulating body comprising a channel defining a winding path, the channel having an inlet and an outlet; heating the electrically insulating body to a temperature above the melting point of an electrically conducting material; flowing the electrically conducting material through the inlet to the outlet to fill the channel; and cooling the electrically insulating body to solidify the electrically conducting material within the channel, thereby forming said winding assembly.

18 Claims, 4 Drawing Sheets

(56) References Cited

U.S. PATENT DOCUMENTS

2015/0187467 A1* 7/2015 Woida-O'Brien .... B29C 64/112
                                                   174/68.1
2015/0333588 A1   11/2015 Hinrich
2017/0282457 A1* 10/2017 Burns ..................... B29C 71/02
2018/0205299 A1   7/2018 Huang et al.

FOREIGN PATENT DOCUMENTS

| | | |
|---|---|---|
| EP | 3113333 | 1/2017 |
| EP | 3142229 A1 | 3/2017 |
| JP | 2018117477 | 7/2018 |
| KR | 20160119424 | 10/2016 |
| WO | 2018147244 | 8/2018 |

OTHER PUBLICATIONS

Great Britain search report dated Jun. 11, 2019, issued in GB Patent Application No. 1815304.9.
Great Britain search report dated Feb. 25, 2019, issued in GB Patent Application No. 1815304.9.
Extended EP Search Report dated Dec. 19, 2019 and issued in connection with European Patent Application No. 1912444.8, 8 pages.
Extended EP Search Report dated Dec. 17, 2019 and issued in connection with European Patent Application No. 19192443.0, 8 pages.

\* cited by examiner

ELECTRICAL MACHINE WINDING ASSEMBLY AND METHOD OF MANUFACTURE THEREOF

CROSS-REFERENCE TO RELATED APPLICATIONS

This application is based upon and claims the benefit of priority from British Patent Application No. GB 1815302.3, filed on 20 Sep. 2018, the entire contents of which are herein incorporated by reference.

BACKGROUND

Technical Field

This disclosure relates to electrical machines and in particular to a winding assembly for an electrical machine and a method of manufacturing the same.

Description of the Related Art

Conventional electrical machine design has certain temperature limitations. These limitations are typically set by the insulation system used on the windings/coils in the electrical machine, which may be a generator or a motor, for example. Electrical machine windings may be on the rotor, on the stator or on both, and typically comprise several turns of an electrically conducting wire, such as copper, wound around a soft magnetic tooth (pole). The electrically conducting wire is coated with an electrically insulating medium to prevent short circuits from occurring: within the winding (turn to turn insulation), between phases (phase to phase insulation) and between the winding and the tooth (phase to earth insulation).

In many electrical machines the insulation is provided by a polymer coating on the copper wire. Polymer-coated wire is rated according to the time that it is able to operate at a particular temperature, e.g. class H wire can operate for 20 000 hours at 180 degrees Celsius, whereas class M wire can operate for 20 000 hours at a higher temperature of 220 degrees Celsius. Class C, rated at up to 240 degrees Celsius, represents the best thermal capability in commonly available electric wires for electrical machines. At temperatures above 220 degrees Celsius there is an approximation that for every 10 degrees Celsius increase in temperature, the lifetime of the insulation is halved, i.e. at 230 degrees Celsius a class M wire will only last 10 000 hours. Thus for most high temperature motor/generator applications the temperature limit is 220 degrees Celsius and if the operating environment or self-heating of the machine creates a temperature greater than this the motor/generator should be actively or passively cooled to keep the wire temperature at or below 220 degrees Celsius.

For applications requiring an operating temperature above 220 degrees Celsius, ceramic insulated wires are available. Ceramic insulators have a better temperature capability than polymers. However they are not as flexible, they suffer from thermal expansion mismatch with the copper wire and they can crack with rapid heating (thermal shock). For one or more of these reasons, whilst ceramic insulated wires are in principle available, they are rarely chosen for use in electrical machine applications as the lifetime can be short due to failure modes such as crackling, thermal shock, etc.

SUMMARY

According to a first aspect there is provided a method of manufacturing a winding assembly for an electrical machine, the method comprising:

forming, by three-dimensional, 3D, printing, an electrically insulating body comprising a channel defining a winding path, the channel having an inlet and an outlet;

heating the electrically insulating body to a temperature above the melting point of an electrically conducting material;

flowing the electrically conducting material through the inlet to the outlet to fill the channel; and cooling the electrically insulating body to solidify the electrically conducting material within the channel, thereby forming said winding assembly.

In the first aspect the winding assembly is manufactured by first 3D printing (also known in the art as additive manufacturing) the insulation in a manner such that a winding path is defined by a channel, and then subsequently introducing an electrically conducting material into the channel to form the winding. Advantageously, 3D printing can be carried out with a wide range of materials and the shape and location of the channel defining the winding path can be precisely controlled in the 3D printing process. Many electrically conducting materials are difficult to 3D print but this issue may be overcome by 3D printing the insulation first and then subsequently adding the electrically conducting material, as per the first aspect. By employing a 3D printing process to make the electrically insulating body of the winding assembly, the shape or cross section of the channel can be made precisely as desired in order to accommodate high frequency operation, where a thinner conductor results in reduced losses associated with the skin effect. Further, the electrically insulating body can be shaped outside of the channels in order to improve heat transfer to the environment, e.g. by forming the body with fins or other projections to to increase surface area for heat exchange. This helps to manage heat transfer from the coil to the environment and also manages power loss within the windings.

The electrically insulating body may be formed by 3D printing with a ceramic material. As set out above, ceramic material, when used as a winding electrical insulation, allows for higher temperature operation of the electrical machine since its melting point is far greater than a conventional polymer coating. Furthermore, by 3D printing the ceramic material, many of the prior known issues with such coatings, e.g. lack of flexibility, can be overcome or ameliorated. The winding assembly formed by 3D printing with a ceramic material is particularly suitable for use at high temperatures and in high voltage electrical machines.

The step of forming the electrically insulating body may comprise firing the 3D printed body to densify the electrically insulating body prior to introduction of the electrically conductive material. The electrically insulating body may for example be formed from a refractory ceramic material such as alumina, which generally requires firing temperatures in excess of 1400 Celsius, i.e. well above the melting temperature of electrically conductive materials such as copper.

The electrically conducting material may be copper, silver or aluminium or an alloy thereof of any of these. The electrically insulating body may be heated to a temperature greater than 1100 degrees Celsius, preferably 1300 degrees Celsius, prior to and during the step of flowing the electrically conducting material. Copper is an excellent electrical conductor and by heating the electrically body to a temperature above the melting point of copper it is able to flow freely into the channel of the electrically insulating body defining the winding path and thereby filling the channel without leaving voids.

The method may further comprise, prior to the step of flowing the electrically conducting material, vibrating the electrically insulating body and/or applying a high-pressure gas stream to the inlet to remove any debris from the channel via the outlet. This helps to ensure the winding path defined by the channel is clear to enable a smooth flowing of the electrically conducting material into the channel.

The method may further comprise applying a lower pressure to the outlet relative to the pressure at the inlet during the step of flowing the electrically conducting material. This aids the electrically conducting material to flow through the channel from the inlet to the outlet and may speed up the process. Further, if a pressurized inert gas is used then the copper is less likely to oxidise.

The channel may be substantially evacuated during the step of flowing the electrically conducting material. This helps to ensure the material fully fills the channel and does not oxidise or pick up other contaminants from the atmosphere within or around the winding assembly.

The channel may be formed internally to the electrically insulating body and the inlet and the outlet may be formed at the surface of the electrically insulating body, such that the channel is contiguous on all sides with the electrically insulating body.

According to a second aspect there is provided a winding assembly for an electrical machine, the winding assembly comprising a monolithic electrically insulating body having a first channel defining a first winding path, the first channel being filled with an electrically conducting material.

Since the electrically insulating body is monolithic (i.e. a single, materially-continuous piece) it is strong and less prone to failure through thermal shock and the like.

The electrically insulating body may be formed of a ceramic material. The electrically conducting material may be copper. Ceramic is an excellent electrical insulator and copper is an excellent electrical conductor. Since ceramics generally have higher melting points than conventional polymer insulation, an electrical machine employing a winding assembly according to the first aspect and with a ceramic insulating material can operate in a high temperature environment without cooling.

The winding assembly may further comprise a second channel defining a second winding path, the second channel being filled with an electrically conducting material, wherein the first and second channels are mutually DC electrically insulated by the electrically insulating body.

The first and second channels may together define a bifilar winding.

The first and second channels may be internal to the electrically insulating body, such that each of the first and second channels are contiguous on all sides with the electrically insulating body.

The winding assembly may further comprise a cavity for receiving a stator tooth.

According to a third aspect there is provided an electrical machine comprising a stator, a rotor and one or more winding assemblies according to the second aspect.

DESCRIPTION OF THE DRAWINGS

Embodiments will now be described by way of example only with reference to the accompanying drawings, which are purely schematic and not to scale, and in which.

DETAILED DESCRIPTION

Figure 1:
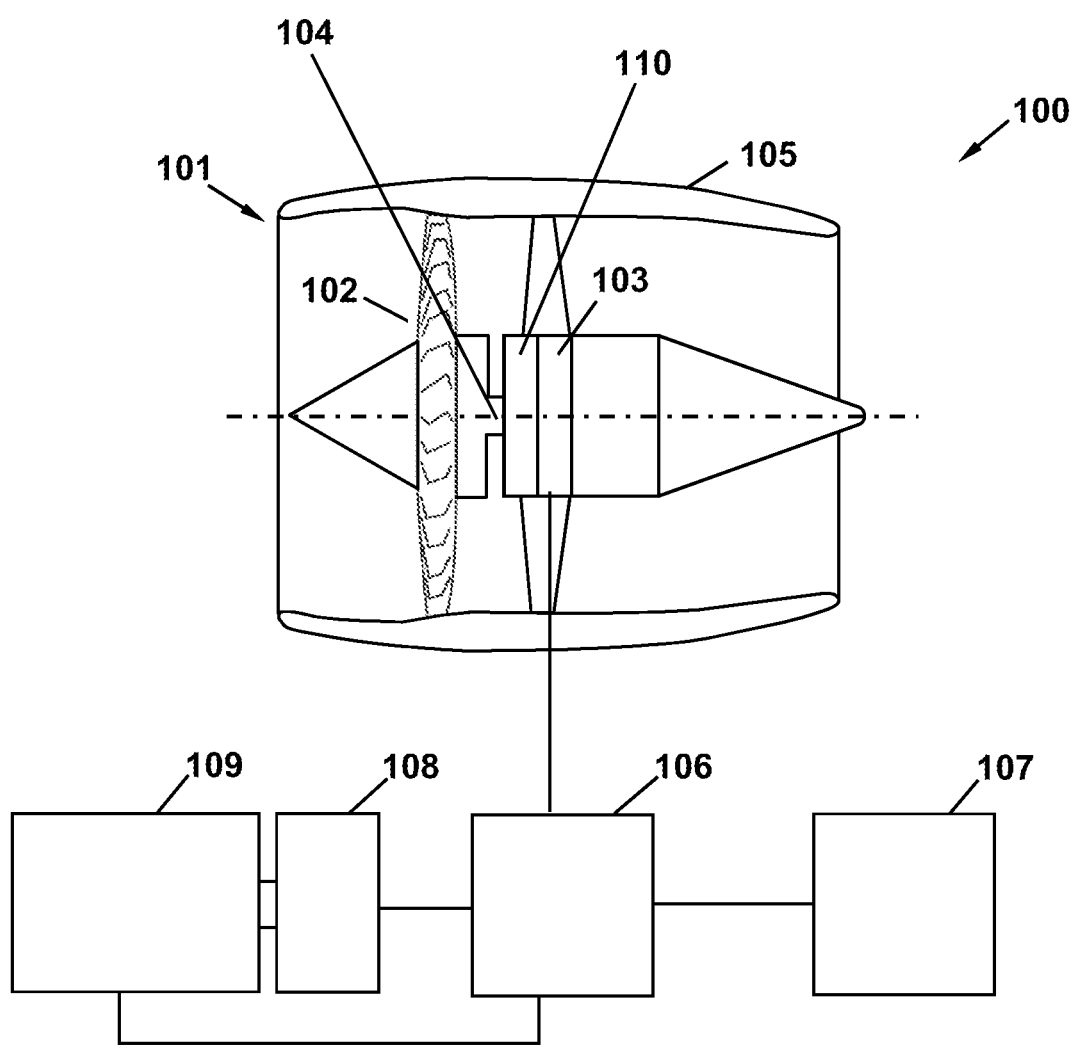
FIG. 1 is a sectional side view of an example hybrid electric aircraft propulsion system.

A schematic diagram of a basic hybrid electric aircraft propulsion system 100 is shown in FIG. 1. An electric propulsion unit, or engine, 101 comprises a fan 102 connected to an electric motor 103 by a central shaft 104. As with a conventional gas turbine engine, the engine 101 comprises a nacelle 105 surrounding the fan 102 and motor 103. The engine 103 is provided with electric power via power electronics in a controller 106, which is connected to an electric storage unit 107, which may include a battery, a supercapacitor or a combination of the two.

The controller 106 is also connected to a generator 108 and a gas turbine engine 109. The gas turbine engine 109 drives the generator 108 to generate electric power, which the controller 106 distributes between the electric storage unit 107 and the electric motor 103. Under some conditions, the electric motor 103 may also act as a generator, for example when a reduction in thrust is demanded and the forward movement of the engine 101 drives the fan 102 until a required fan speed is reached. Energy may then be taken from the motor 103 and stored in the electric storage unit 107.

The controller 106 takes inputs from the aircraft control system (not shown), which provides a thrust or fan speed demand. The controller 106 then manages how the demand is achieved, by balancing use of the gas turbine engine 109 and generator 108 with the electric storage unit 107. For example, when a step increase in demand is received, the controller 106 may use the electric storage unit 107 to provide an immediate increase in electric power to the motor 103, while the gas turbine engine 109 is powered up more slowly to accommodate for the different behaviour of the gas turbine 109. Once the gas turbine engine 109 has reached a required power output level, the balance of power taken from the generator 108 and electric storage unit 107 can shifted so that all of the electric power comes from the generator 108, and an additional amount can be used to recharge the electric storage unit 107.

The generator 108 and electric motor 103 of the hybrid electric aircraft propulsion system 100 are two examples of electrical machines. Electrical machines such as electric motor 103 and generator 108 generally contain a plurality of coils/windings each formed of a number of electrically insulated turns of an electrically-conducting wire forming a winding assembly. The winding assembly may be provided on the stator, rotor or both.

Figure 2:
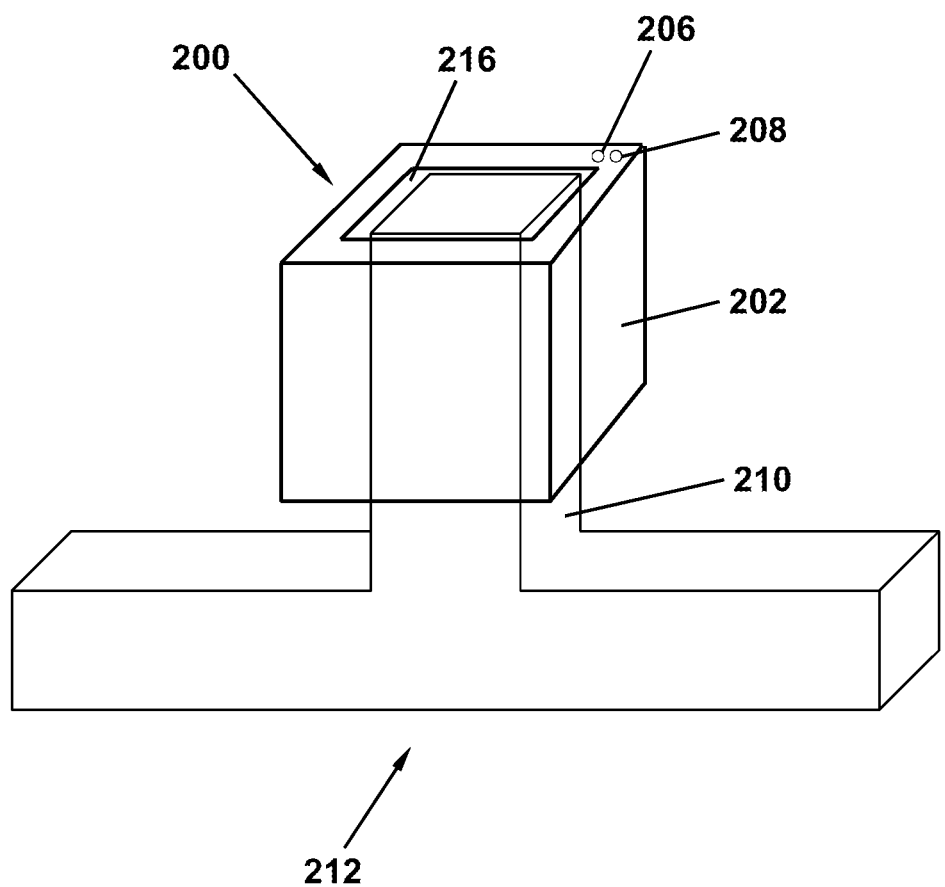
FIG. 2 illustrates a winding assembly mounted on a tooth.

FIG. 2 illustrates an example electrical machine winding assembly 200. The winding assembly 200 is shown in situ on a magnetic tooth 210 of a stator 212 forming part of an electrical machine such as an electric motor or generator described above with reference to FIG. 1. The winding assembly consists of an electrically insulating body 202 formed of e.g. ceramic or another electrically insulating material. The winding assembly 200 also has a central cavity 216 which is shaped to receive the tooth of a stator 212 or rotor on which the winding assembly 200 is to be located.

The electrically insulating body 202 is formed by 3D printing the ceramic material. In this manner, the electrically insulating body 202 can be formed with a channel 204 defining a winding path, shown in FIGS. 3 and 4. The channel 204 is preferably internal to the insulating body 202 such that it is contiguous on all available sides with the electrically insulating body 202. The channel 204 has an inlet (or runner) 206 and an outlet (or riser) 208 at the surface of the electrically insulating body 202. Since the electrically insulating body 202 is 3D printed, it is effectively a single, materially continuous, i.e. monolithic, piece. This makes it stronger and less prone to failure through thermal shock and the like.

Figure 3:
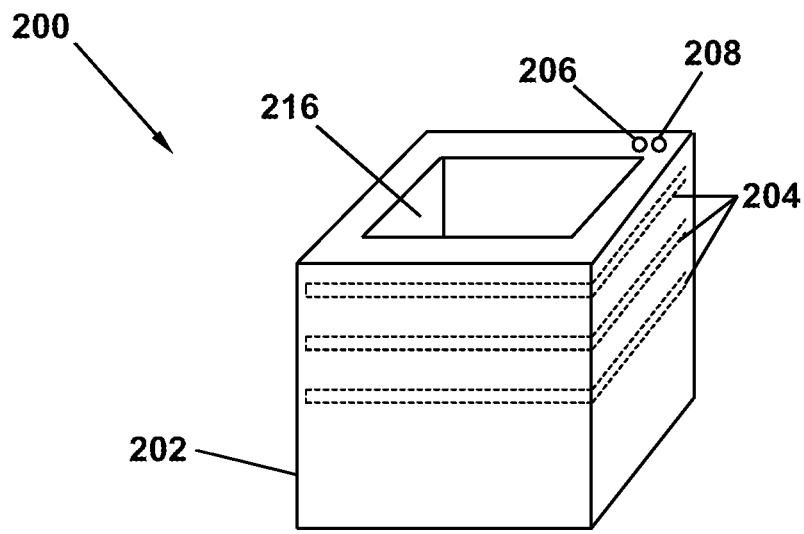
FIG. 3 illustrates channels of an electrically insulating body of a winding assembly prior to filling with an electrically conducting material.
Figure 4:
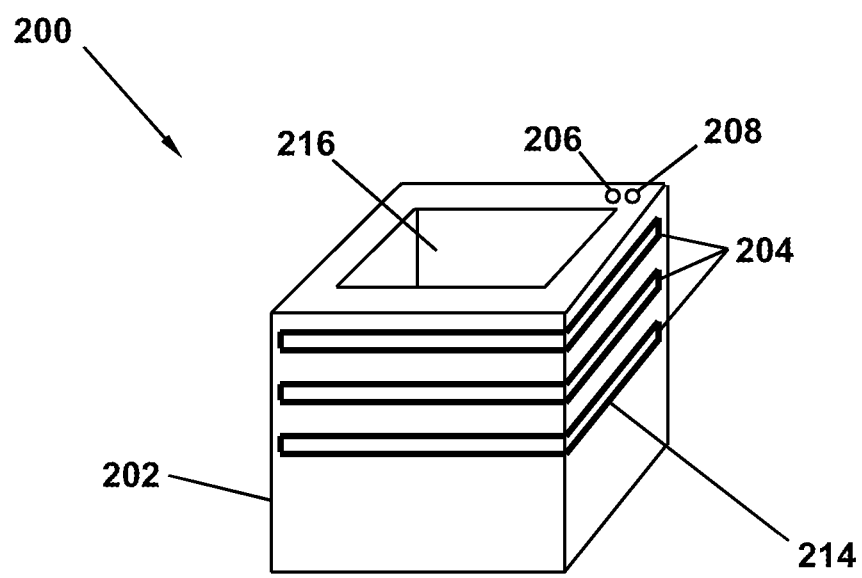
FIG. 4 illustrates channels of an electrically insulating body of a winding assembly after filling with an electrically conducting material.

In FIG. 3 the channel 204 is hollow, whereas in FIG. 4 the channel 204 is shown filled with an electrically conducting material 214, such as copper. The channel 204 is filled with the electrically conducting material 214 by first heating the electrically insulating body 202 to a temperature above the melting point of the electrically conducting material 214. For example, if copper is used as the electrically conducting material 214 then the electrically insulating body 202 is heated to a temperature in excess of 1000 degrees Celsius, preferably 1300 degrees Celsius. Then, once the electrically insulating body 202 and the channel 204 within it have reached a temperature above the melting point of the electrically conducting material 214, molten electrically conducting material 214 is flowed into the channel 204 via the inlet/runner 206 to fill the channel 204 through to the outlet/riser 208. Once the channel is filled with electrically conducting material 214 the winding assembly 200 is cooled down in order to solidify the electrically conducting material 214 within the channel 204 to thereby form the winding. The inlet 206 and outlet 208 then serve as electrical terminals for the winding in order to connect it to adjacent windings or to a power supply, for example.

Before the molten electrically conducting material 214 is flowed into the channel 204 it may be advantageous to vibrate the electrically insulating body 202 and/or apply a high-pressure gas flow from the inlet 206 to the output 208 in order to remove any debris from the channel 204. Such debris may be, for example, loose ceramic dust or fragments within the channel 204 left over from the 3D printing process used to form the electrically insulating body 202 or any other foreign bodies which may otherwise prevent a smooth flowing of the electrically insulating material 214 into the channel 204.

In order to assist the flowing of the molten electrically insulating material 214 into the channel 204, the pressure at the outlet 208 may be held lower than the pressure at the inlet 206 in order to effectively draw the molten electrically insulting material 214 through the channel 204 from the inlet 206 to the outlet 208. Alternatively the flowing in of the electrically conducting material 214 may be done in vacuum or near vacuum conditions in order to prevent oxidation or contamination of the electrically conducting material from contaminants in the atmosphere.

The winding assembly 200 with the channel 204 filled with copper may operate at temperatures up to approximately 1000 degrees Celsius without being subject to deleterious phenomena such as partial discharge. Winding the assemblies disclosed herein do not necessarily require a cooling system because of their higher maximum operating temperature compared to conventional windings based on polymer insulation. This opens up the option of using alternative machine topologies (non-permanent magnet) such as induction, switched reluctance, and synchronous electrical machines. These have added advantages including: simpler operation, no/reduced complexity converter and eliminated cooling system. This results in less weight and a more power dense electrical system.

Whilst the winding assembly 200 described with reference to FIGS. 2 to 4 is shown with one winding channel 204, the winding assembly could be formed with multiple winding channels which are direct-current (DC) electrically isolated from one another and are therefore electrically separate windings of the electrical machine in which the winding assembly is employed. In this manner, the 3D printing process can be used to carefully control the geometry and interplay of the different windings. For example, a bifilar winding could be created from two separate channels inside the electrically insulating body of the winding assembly. Whilst the electrically insulating body provides DC electrical isolation between the two or more windings it will still allow for inductive coupling between windings.

An electric motor 103 comprising winding assemblies 200 of the type described herein is particularly suitable for high speed, high power output applications, for example in aerospace applications where power to weight ratio is an important factor. Such an electric motor 103 may therefore be suitable for use in electric propulsion applications such as an electric propulsor 101 of the type illustrated in FIG. 1. The propulsor 101 may further comprise a gearbox 110 connected to receive an input from the electric motor 103 and to output drive to the fan 102 via shaft 104 so as to drive the fan 102 at a lower rotational speed than the electric motor 103. The use of a gearbox 110 allows the electric motor to be driven at higher speeds, thereby allowing the use of a smaller motor for the same power output. Winding assemblies 200 may also find application in other machines having operating in a high temperature/voltage environment, such as hybrid trains, electric turbocharging for diesel engines and hybrid drives for yachts.

Figure 5:
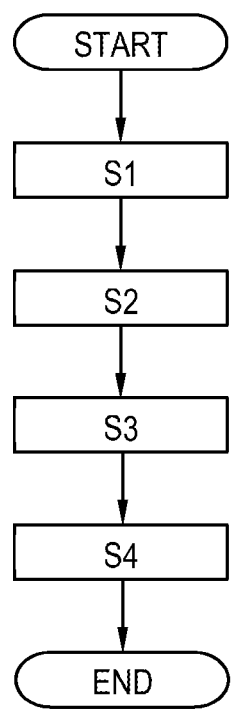
FIG. 5 is a flowchart corresponding to a method of manufacturing a winding assembly.

FIG. 5 is a flow chart corresponding to a method of manufacturing a winding assembly for an electrical machine, the method comprising the steps of:

S1: forming, by three-dimensional, 3D, printing, an electrically insulating body comprising a channel defining a winding path, the channel having an inlet and an outlet;

S2: heating the electrically insulating body to a temperature above the melting point of an electrically conducting material;

S3: flowing the electrically conducting material through the inlet to the outlet to fill the channel; and S4: cooling the electrically insulating body to solidify the electrically conducting material within the channel, thereby forming said winding assembly.

Step S1 may further comprise firing to densify the 3D printed electrically insulating body, for example if the 3D printed body is formed from a ceramic powder with a binder. As with conventional ceramic processing, the binder may be removed by pyrolysis at temperatures up to around 400-500 Celsius, followed by high temperature firing, typically at temperatures of over 1200 Celsius, of the remaining ceramic material, the firing temperature dependent on the type of ceramic material.

Whilst the winding assembly 200 described with reference to FIGS. 2 to 4 has a generally regular shape, the skilled person would appreciate that the shape is not limited as such and instead it may assume any shape as desired and which may be produced by a 3D printing process.

Various examples have been described, each of which feature various combinations of features. It will be appreciated by those skilled in the art that, except where clearly mutually exclusive, any of the features may be employed separately or in combination with any other features and the invention extends to and includes all combinations and sub-combinations of one or more features described herein.

The invention claimed is:

1. A method of manufacturing a winding assembly for an electrical machine, the method comprising:
    forming, by three-dimensional, 3D, printing, an electrically insulating body comprising a channel defining a winding path, the channel having an inlet and an outlet;
    heating the electrically insulating body to a temperature above the melting point of an electrically conducting material;
    flowing the electrically conducting material through the inlet to the outlet to fill the channel, wherein the channel fully encloses the electrically conducting material but for the inlet and the outlet;
    cooling the electrically insulating body to solidify the electrically conducting material within the channel, thereby forming said winding assembly; and
    prior to the step of flowing the electrically conducting material, vibrating the electrically insulating body and/or applying a stream of gas to the inlet to remove any debris from the channel via the outlet.

2. The method according to claim 1, wherein the electrically insulating body is formed by 3D printing with a ceramic material.

3. The method according to claim 1, wherein the electrically conducting material is copper, or an alloy thereof, and the electrically insulating body is heated to a temperature greater than 1100 degrees Celsius, preferably 1300 degrees Celsius, prior to and during the step of flowing the electrically conducting material.

4. A method of manufacturing a winding assembly for an electrical machine, the method comprising:
    forming, by three-dimensional, 3D, printing, an electrically insulating body comprising a channel defining a winding path, the channel having an inlet and an outlet;
    heating the electrically insulating body to a temperature above the melting point of an electrically conducting material;
    flowing the electrically conducting material through the inlet to the outlet to fill the channel;
    cooling the electrically insulating body to solidify the electrically conducting material within the channel, thereby forming said winding assembly;
    prior to the step of flowing the electrically conducting material, vibrating the electrically insulating body and/or applying a stream of gas to the inlet to remove any debris from the channel via the outlet; and
    applying a lower pressure to the outlet relative to the pressure at the inlet during the step of flowing the electrically conducting material.

5. The method according to claim 1, wherein the channel is substantially evacuated during the step of flowing the electrically conducting material.

6. The method according to claim 1, wherein the channel is formed internally to the electrically insulating body and the inlet and outlet are formed at the surface of the electrically insulating body, such that the channel is contiguous on all sides within the electrically insulating body.

7. A winding assembly for an electrical machine, the winding assembly comprising
    a monolithic electrically insulating body having a first channel defining a first winding path, the first channel having an inlet and an outlet formed at an outer surface of the electrically insulating body and being filled with an electrically conducting material,
    wherein the first channel fully encloses the electrically conducting material but for the inlet and the outlet.

8. The winding assembly according to claim 7, wherein the electrically insulating body is formed of a ceramic material.

9. The winding assembly according to claim 7, wherein the electrically conducting material is copper or a copper-based alloy.

10. The winding assembly according to claim 7, further comprising a second channel defining a second winding path, the second channel being filled with an electrically conducting material, wherein the first and second channels are mutually DC electrically insulated by the electrically insulating body.

11. The winding assembly according to claim 10, wherein the first and second channels together define a bifilar winding.

12. The winding assembly according to claim 10, wherein the first and second channels are internal to the electrically insulating body, such that each of the first and second channels are contiguous on all sides with the electrically insulating body.

13. The winding assembly according to claim 7, further comprising a cavity for receiving a stator tooth.

14. An electrical machine comprising:
    a stator;
    a rotor; and
    one or more winding assemblies according to claim 7.

15. The winding assembly of claim 7, wherein the monolithic electrically insulating body includes a central cavity shaped to receive a tooth of a stator or rotor.

16. The winding assembly of claim 7, wherein the monolithic electrically insulating body includes four sidewalls arranged to define a quadrilateral shape.

17. The winding assembly of claim 16, wherein the first channel is formed entirely internally within the four sidewalls.

18. The winding assembly of claim 17, wherein each sidewall of the four sidewalls includes a top surface, and wherein the inlet and the outlet are formed in the top surface of one of the four sidewalls.

* * * * *